US010627709B2

(12) United States Patent
Yoneda et al.

(10) Patent No.: US 10,627,709 B2
(45) Date of Patent: Apr. 21, 2020

(54) LIGHT SOURCE, PROJECTION DEVICE, MEASUREMENT DEVICE, ROBOT, ELECTRONIC DEVICE, MOBILE OBJECT, AND SHAPING APPARATUS

(71) Applicants: Kazuhiro Yoneda, Osaka (JP); Yoshihiko Miki, Kyoto (JP); Naoki Fukuoka, Osaka (JP)

(72) Inventors: Kazuhiro Yoneda, Osaka (JP); Yoshihiko Miki, Kyoto (JP); Naoki Fukuoka, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/442,925

(22) Filed: Jun. 17, 2019

(65) Prior Publication Data

US 2020/0004127 A1    Jan. 2, 2020

(30) Foreign Application Priority Data

Jun. 29, 2018 (JP) .................................. 2018-125396
Apr. 24, 2019 (JP) .................................. 2019-082860

(51) Int. Cl.
| | | |
|---|---|---|
| G03B 1/20 | (2006.01) | |
| G03B 1/56 | (2006.01) | |
| H04N 9/31 | (2006.01) | |
| G02B 27/48 | (2006.01) | |
| G03B 21/625 | (2014.01) | |
| G03B 21/62 | (2014.01) | |
| G03B 21/58 | (2014.01) | |

(Continued)

(52) U.S. Cl.
CPC ......... *G03B 21/2033* (2013.01); *G02B 27/48* (2013.01); *G03B 21/56* (2013.01); *G03B 21/58* (2013.01); *G03B 21/60* (2013.01); *G03B 21/62* (2013.01); *G03B 21/625* (2013.01); *H04N 9/3129* (2013.01)

(58) Field of Classification Search
CPC ........ G03B 21/56; G03B 21/60; G03B 21/58; G03B 21/625; G03B 21/62; G02F 1/37; H01S 5/022; H01S 5/183; H01S 5/40
USPC ....................................................... 359/443
See application file for complete search history.

(56) References Cited

U.S. PATENT DOCUMENTS 5,982,498 A * 11/1999 Byatt ..................... G01N 21/55
                                                    356/121
2003/0085867 A1* 5/2003 Grabert .............. G02B 26/0833
                                                    345/156

(Continued)

FOREIGN PATENT DOCUMENTS

| JP | 2002-296514 | 10/2002 |
|---|---|---|
| JP | 2006-138926 | 6/2006 |

(Continued)

*Primary Examiner* — Clayton E. LaBalle
*Assistant Examiner* — Kevin C Butler
(74) *Attorney, Agent, or Firm* — Oblon, McClelland, Maier & Neustadt, L.L.P.

(57) ABSTRACT

There is provided an improved light source including a plurality of light emitting elements in a surface. An arrangement of the plurality of light emitting elements fulfills, in an assumed projection area, an element interval at which irradiation light beams of the plurality of light emitting elements overlaps, and fulfills an element interval at which a speckle pattern of each of the irradiation light beams obtained in the assumed projection area is different for each of the irradiation light beams.

15 Claims, 13 Drawing Sheets

(51) Int. Cl.
*G03B 21/60* (2014.01)
*G03B 21/20* (2006.01)
*G03B 21/56* (2006.01)

(56) References Cited

U.S. PATENT DOCUMENTS

| | | | |
|---|---|---|---|
| 2016/0006914 A1* | 1/2016 | Neumann | G06F 3/0325 |
| | | | 348/78 |
| 2018/0264739 A1* | 9/2018 | Okawa | B29C 64/393 |
| 2019/0170506 A1* | 6/2019 | Matsumoto | G01B 11/25 |

FOREIGN PATENT DOCUMENTS

| | | | | |
|---|---|---|---|---|
| JP | 2006138926 | * | 6/2006 | G02B 26/08 |
| JP | 2009-146941 | | 7/2009 | |
| JP | 2009146941 | * | 7/2009 | G02F 1/37 |
| JP | 2015-524050 | | 8/2015 | |
| JP | 2016-217833 | | 12/2016 | |
| JP | 2017-532533 | | 11/2017 | |
| JP | 2018-146521 | | 9/2018 | |
| JP | 2018146521 | * | 9/2018 | B25J 13/08 |
| WO | WO2013/171613 A1 | | 11/2013 | |
| WO | WO-2013171613 A1 | * | 11/2013 | A61B 5/107 |
| WO | WO2014/083485 A1 | | 6/2014 | |
| WO | WO2016/024273 A1 | | 2/2016 | |

* cited by examiner

LIGHT SOURCE, PROJECTION DEVICE, MEASUREMENT DEVICE, ROBOT, ELECTRONIC DEVICE, MOBILE OBJECT, AND SHAPING APPARATUS

CROSS-REFERENCE TO RELATED APPLICATIONS

This patent application is based on and claims priority pursuant to 35 U.S.C. § 119(a) to Japanese Patent Application No. 2018-125396, filed on Jun. 29, 2018 and Japanese Patent Application No. 2019-082860, filed on Apr. 24, 2019, in the Japan Patent Office, the entire disclosures of which are hereby incorporated by reference herein.

BACKGROUND

Technical Field

Embodiments of the present disclosure relate to a light source, a projection device, a measurement device, a robot, an electronic device, a mobile object, and a shaping apparatus.

Description of the Related Art

The laser light source has advantages that a light emitting diode (LED) does not have, such as high-power output by resonator amplification and focus free, and is adopted in various devices such as a projector and a distance measurer. However, hyper-coherence (coherence) which is a characteristic property of laser light causes a spotted pattern flicker called speckle noise to occur in a retina of an eye, which is an observed surface where an irradiated object is observed, and an image sensor of a camera. Since the speckle noise adversely affects image quality and measurement accuracy and becomes a disadvantage in using a laser, it is required to reduce the speckle noise when using a laser.

SUMMARY

In one aspect of this disclosure, there is provided an improved light source including plurality of light emitting elements in a surface. An arrangement of the plurality of light emitting elements fulfills, in an assumed projection area, an element interval at which irradiation light beams of the plurality of light emitting elements overlaps, and fulfills an element interval at which a speckle pattern of each of the irradiation light beams obtained in the assumed projection area is different for each of the irradiation light beams. In another aspect of this disclosure, there is provided an improved light source including a plurality of surface light emitting elements. An arrangement of the plurality of surface light emitting elements is such that an element interval in which irradiation light beams of at least adjacent surface light emitting elements of the plurality of surface light emitting elements overlap, and that the element interval is set in such a manner that a speckle pattern in an irradiated area of the irradiation light beams differs for each of the irradiation light beams.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
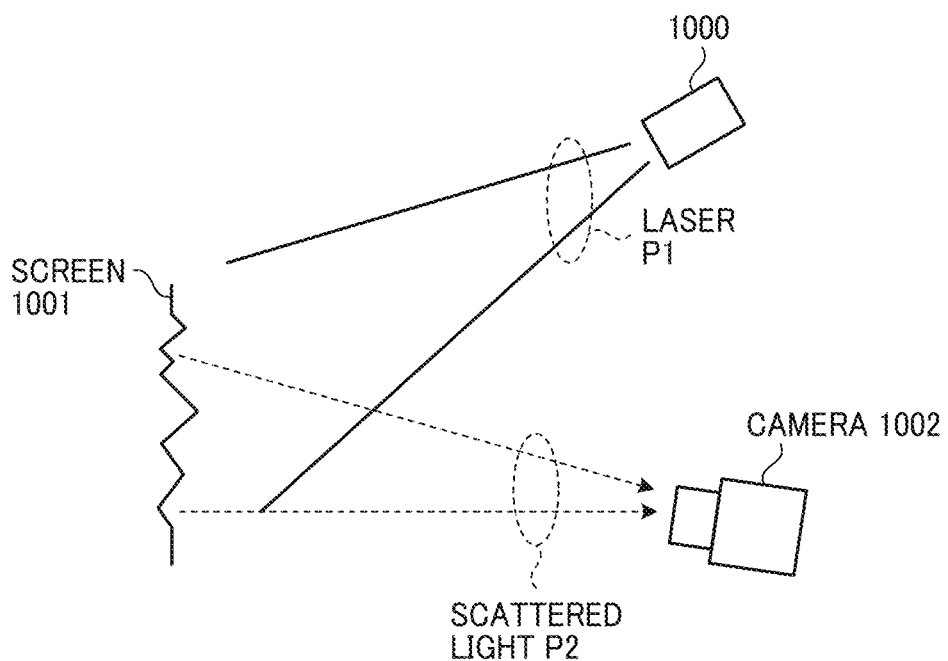
FIG. 1A is a conceptual diagram illustrating a principle of generation of a speckle noise of a laser.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of a light source, a projection device, a measurement device, a robot, an electronic device, a mobile object, and a shaping apparatus will be described with reference to the accompanying drawings. The embodiments of the present disclosure are not limited by the following embodiments.

First Embodiment

First, a speckle which develops on an observed surface according to a first embodiment and a principle to eliminate the speckle will be described.

Figure 1B:
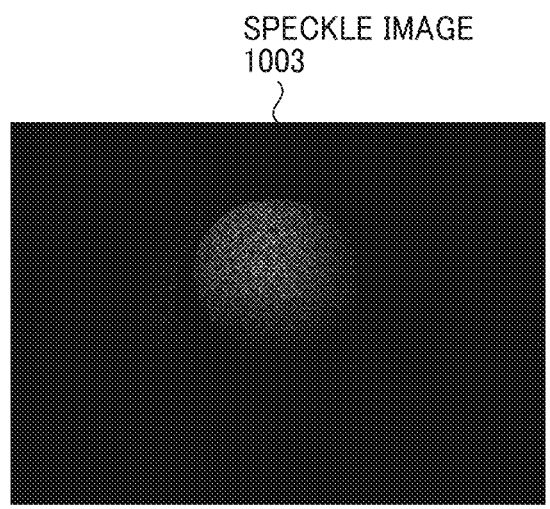
FIG. 1B is a speckle image.

FIG. 1A is a conceptual diagram illustrating a principle of generation of a speckle noise of a laser. FIG. 1B is a speckle image. FIG. 1A illustrates a system configured by a laser light source 1000, a screen 1001, and a camera 1002. FIG. 1B illustrates an observation image (a speckle image) 1003 observed by the camera 1002 in a case where a solid image is projected from the laser light source 1000 to the screen 1001. The observation image 1003 includes the speckle developed on an image sensor of the camera 1002.

When the solid image is projected from the laser light source 1000 to the screen 1001, a part of light P1 constituting the solid image is multiply scattered in an inside of a surface of the screen 1001. While the multiply scattered light comes out from the inside of the surface of the screen 1001 to the outside, scattered light P2 coming out to the outside is added with a random phase component due to a shape of irregularities (roughness) on the surface of the screen 1001. The scattered light P2 is converged on the observed surface (image sensor) of the camera 1002 via an optical system such as a lens, and the scattered light P2 interferes and overlaps with each other on the observed surface because laser light is coherent light. As a result, bright and dark places appear randomly on the observed surface, and a spotted speckle pattern is observed. This flicker of light and dark is a noise source that adversely affects image quality and various measurements. This phenomenon is a complex phenomenon in which all elements of a light projection system, an object, and a light receiving system are entangled, and the speckle pattern to be observed changes largely depending on a lens size of the camera 1002, a pixel size of the image sensor, and the like.

While FIG. 1B illustrates the observation image 1003 when observed with the camera 1002, even when a solid image projected on the screen 1001 is observed with human eyes with such as a laser display instead of the camera 1002, a similar speckle pattern appears on a retina.

Subsequently, a fact that speckle noise can be reduced will be qualitatively described. First, an index of speckle noise will be described. A following formula (1) represents a speckle contrast (Cs) used as the index of speckle noise.

$$Cs = \sigma/S \quad (1)$$

In the formula (1), S is an average luminance value of a captured image when a solid image is projected, and $\sigma$ is a standard deviation. As indicated in the formula (1), Cs is represented by a reciprocal of a signal-to-noise ratio (SNR) indicating a general signal strength. The lower the contrast value represented by Cs in formula (1), the lower the speckle noise and the smaller the flicker of the image.

The speckle pattern observed on the observed surface is a complex pattern in which all elements of a light projection system, an object, and a light receiving system are entangled. Generally, if there are a plurality of laser light sources 1000, the speckle pattern developed by each laser light source 1000 is not the same but random. Therefore, if the plurality of the laser light sources 1000 are provided to generate a different speckle pattern for each laser light source 1000 and those speckle patterns are superimposed on the observed surface, speckle noise of the observed surface is averaged by the plurality of random speckle patterns and thus the speckle noise is reduced.

On the basis of this idea, the formula (1) is further modified with regard to a relation between averaging and reduction of speckle noise. For n (n is a natural number) speckle patterns overlapping on the observed surface (each speckle pattern image is referred to as a speckle image), an average luminance of the speckle image k is $S_k$, a standard deviation is $\sigma_k$, a speckle contrast is $Cs_k$. In this case, when the laser light source 1000 of an irradiation source has the same power, the average luminance $S_k$, the standard deviation $\sigma_k$, and the speckle contrast $Cs_k$ of the respective speckle images become equal. Thus, the relation can be considered to be following formulae (2) through (4).

$$S_1 = S_2 = S_3 = \ldots = S_n = S \quad (2)$$

$$\sigma_1 = \sigma_2 = \sigma_3 = \ldots = \sigma_n = \sigma \quad (3)$$

$$Cs_1 = Cs_2 = Cs_3 = \ldots = Cs_n = Cs \quad (4)$$

Therefore, a luminance value $S_{SUM}$ in a case of combining n speckle images is expressed by a following formula (5) by applying a condition of the formula (2).

$$S_{SUM} = S_1 + S_2 + S_3 + \ldots + S_n = S \times n \quad (5)$$

In addition, with regard to a standard deviation $\sigma_{SUM}$, additivity of variance of a following formula (6) can be used.

$$\sigma_{SUM}^2 = \sigma_1^2 + \sigma_2^2 + \sigma_3^2 + \ldots + \sigma_n^2 \quad (6)$$

By applying a condition of the formula (3) to the formula (6), a following formula (7) is obtained.

$$\sigma_{SUM} = \sqrt{(\sigma^2 \times n)} = \sigma\sqrt{n} \quad (7)$$

From the above, a speckle contrast ($Cs_{SUM}$) of the observation image observed by superimposing n speckle images is expressed by a following formula (8).

$$Cs_{SUM} = \sigma\sqrt{n}/(S \times n) = (\sqrt{n}/n) \times (\sigma/S) = 1/\sqrt{n} \times Cs \quad (8)$$

The formula (8) indicates that the speckle contrast is improved (reduced) to $1/\sqrt{n}$ by averaging n speckle images. Therefore, in a calculation, it can be expected that the speckle contrast (Cs) would improve by $1/\sqrt{n}$ when a number of the laser light sources 1000 is n.

Here, in order to obtain the above calculation result, it is required to superimpose a plurality of random speckle patterns, that is, it is premised that the speckle patterns developed by the respective laser light sources 1000 are different. This problem can be solved, for example, by utilizing multiple light source angle-multiplexing. In the multiple light source angle-multiplexing, speckle images are multiplexed by a method in which an incident angle of light to an observation point is made different for each light source, thereby generating a different speckle pattern for each light source. Therefore, in the following, a setting of a surface emitting semiconductor laser fulfilling the above formula (8) will be examined with the use of multiple light source angle-multiplexing as an example.

Figure 2:
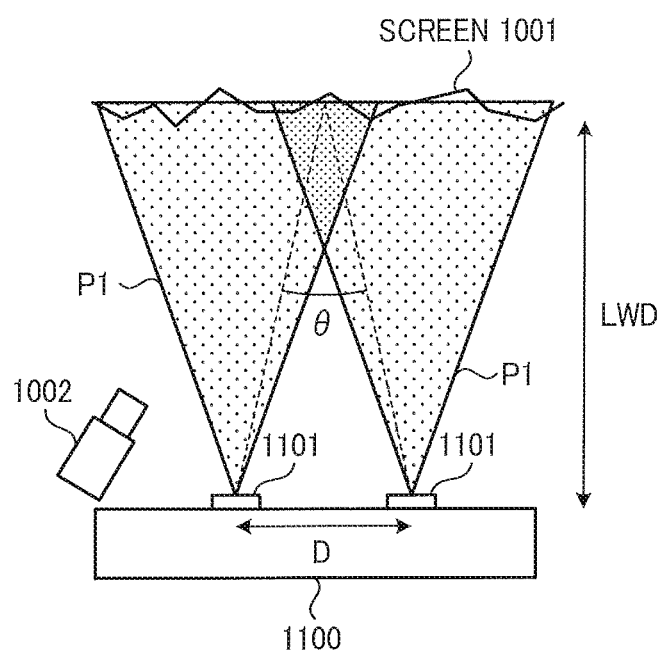
FIG. 2 is a diagram illustrating a relation between an interval of a light source and an incident angle to an observation point.

FIG. 2 is a diagram illustrating a relation between an interval of a light source and an incident angle to an observation point. The system illustrated in FIG. 2 is configured by the camera 1002, the screen 1001, and a vertical cavity surface emitting laser (VCSEL) light source 1100.

The VCSEL light source 1100 is an example of a "surface emitting semiconductor laser". The VCSEL light source 1100 includes, in a surface, a large number of light emitting elements 1101 corresponding to the laser light source 1000. Here, two light emitting elements 1101 out of a large number of light emitting elements 1101 are illustrated to explain the incident angle. Each light emitting element 1101 is an element such as a semiconductor laser diode that emits coherent light.

A white diffusion plate is used for the screen 1001. In this system, an angle θ made by respective lights incident on the screen 1001 from two light emitting elements 1101 changes by changing a distance (LWD) from the VCSEL light source 1100 to the screen 1001 and a distance (D) between the two light emitting elements 1101 of the VCSEL light source 1100. For example, when the distance (D) between the light emitting elements 1101 is increased, the θ is increased, and when the distance (LWD) to the screen 1001 is increased, the θ is decreased. That is, a value of the θ can be changed by adjusting an interval between light sources and the distance between the light source and the screen.

Figure 3:
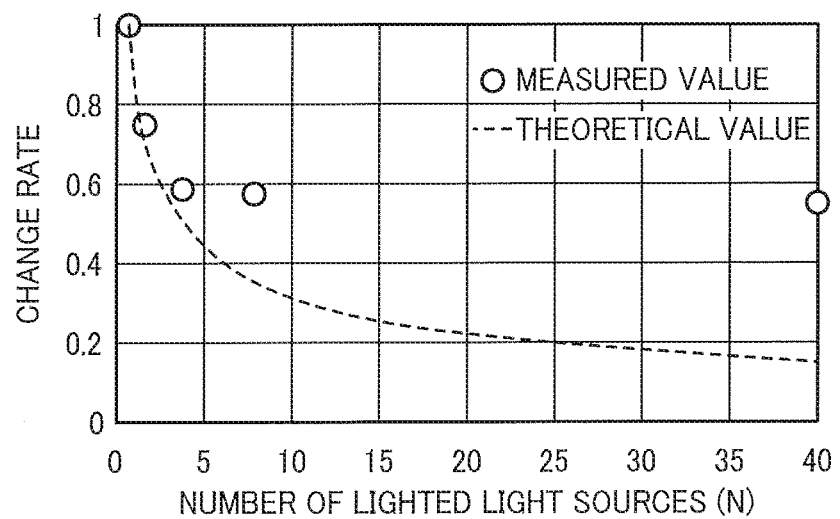
FIG. 3 is a graph illustrating experimental results in a case of using a 40 cH-VCSEL light source ($\lambda$=780 nm) in which a pitch between light emitting elements is 50 µm or less.

FIG. 3 is a graph illustrating experimental results in a case of using a 40 cH-VCSEL light source in which a pitch (D) between light emitting elements is 50 μm or less. An oscillation wavelength of each light emitting element is uniformly λ=780 nm. In FIG. 3, a horizontal axis represents a number of lighted light sources (n), and a vertical axis represents a change rate of the speckle contrast (Cs), and a measurement result of speckle noise is plotted. The vertical axis represents a change rate when the speckle pattern at n=1 is used as a reference for the speckle contrast (Cs).

A dashed line graph of FIG. 3 is a curve (theoretical value curve) graph representing a theoretical value of $1/\sqrt{n}$ represented by the formula (8). From this measurement result, it is understood that the speckle contrast (Cs) is decreased following the curve graph of the theoretical value until a number of lighted light sources is 4 (that is, n=4), and the speckle noise is reduced. However, when the number of the lighted light sources is n=4 and even if the number of the lighted light sources is sequentially increased from four, the speckle contrast (Cs) hardly changes and the speckle noise does not decrease in accordance with the theoretical value.

However, even if the number of the lighted light sources is increased to 40, the speckle contrast (Cs) hardly changes compared to a case where the number of the lighted light sources is four, and an actual reduction effect is ⅓ or less of the theoretical value.

From this result, it can be seen that the speckle noise reduction effect is stopped to a certain extent by simply increasing the number of the lighted light sources, and sufficient reduction of the speckle noise cannot be expected even if the number of the lighted light sources is increased. Therefore, it can be understood that the speckle noise reduction effect is limited by simply using a plurality of light emitting elements arrayed as the VCSEL light source 1100.

Therefore, the inventor examined a design for efficiently integrating a light emitting element that contributes to speckle reduction in the VCSEL light source 1100.

In an experiment, the θ is assigned by gradually changing an element interval (D) of the VCSEL light source 1100 illustrated in FIG. 2. Then, for each value of the θ, one light emitting element and a light emitting element at an element interval corresponding to the θ are lit, and the screen 1001 is captured by the camera 1002. Then, the speckle contrast (Cs) of an overlapping speckle pattern is measured for each value of the θ from the image captured by the camera 1002.

Figure 4:
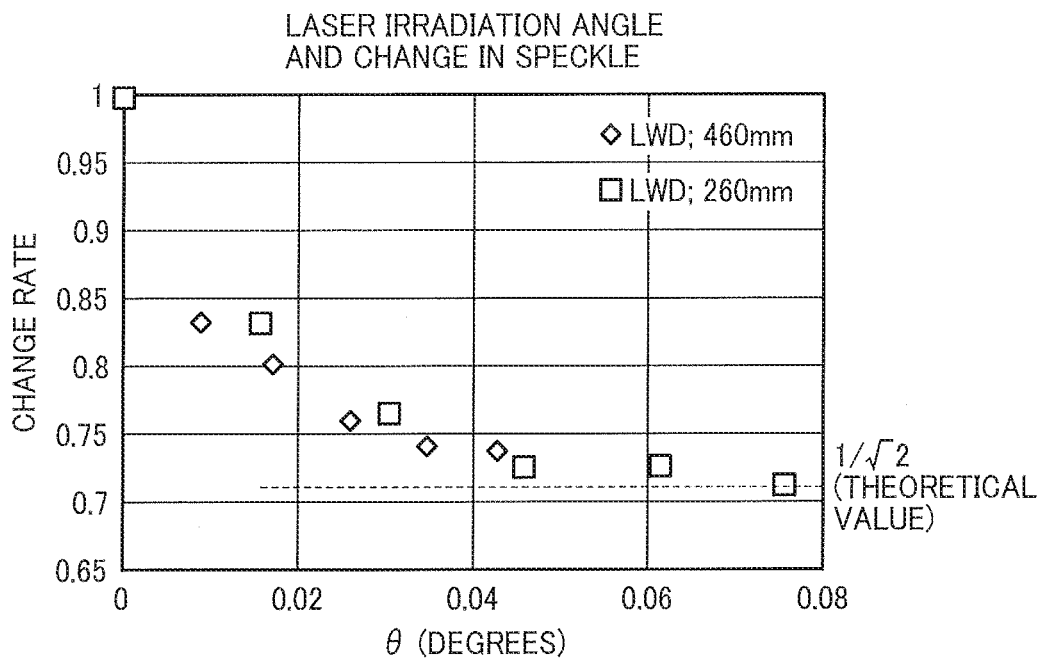
FIG. 4 is a graph illustrating an example of experimental results when $\theta$ is changed.

FIG. 4 is a graph illustrating an example of experimental results when the θ is changed. FIG. 4 illustrates experimental results in a case where a horizontal axis is θ and a vertical axis is a change rate of the speckle contrast (Cs).

From the results illustrated in FIG. 4, it can be seen that the speckle contrast (Cs) decreases as the θ is increased, and when the θ reaches approximately 0.04 to 0.05 degrees, the speckle contrast (Cs) converges to a theoretical value $1/\sqrt{2}$ represented by the formula (8). From this experimental result, it can be seen that there is θ that converges to the theoretical value $1/\sqrt{2}$. Hereinafter, a setting for converging to the theoretical value indicated by this experimental result is generically referred to as a "setting having a speckle noise reduction effect" or the like.

As described above, the value per se of 0.04 to 0.05 degrees is not an absolute value because the value changes depending on various conditions such as geometric conditions of the camera 1002 and the screen 1001 and a surface roughness of an object to be measured. This experimental result suggests that, when obtaining the speckle noise reduction effect by multiple light source angle-multiplexing with the use of the VCSEL light source 1100, a design layout (arrangement) for securing an appropriate distance between the light emitting elements 1101 is required in consideration of a distance with the object, etc. That is, the light emitting elements are integrated on a surface of a VCSEL light source with an appropriate element interval on the basis of this experimental result, it is possible to reduce speckle noise without increasing a size and a cost of an illuminator.

Subsequently, an example of a layout configuration for a VCSEL light source in which light emitting elements are integrated with the "setting having a speckle noise reduction effect" illustrated in the experimental results of FIG. 4.

Example 1

Figure 5:
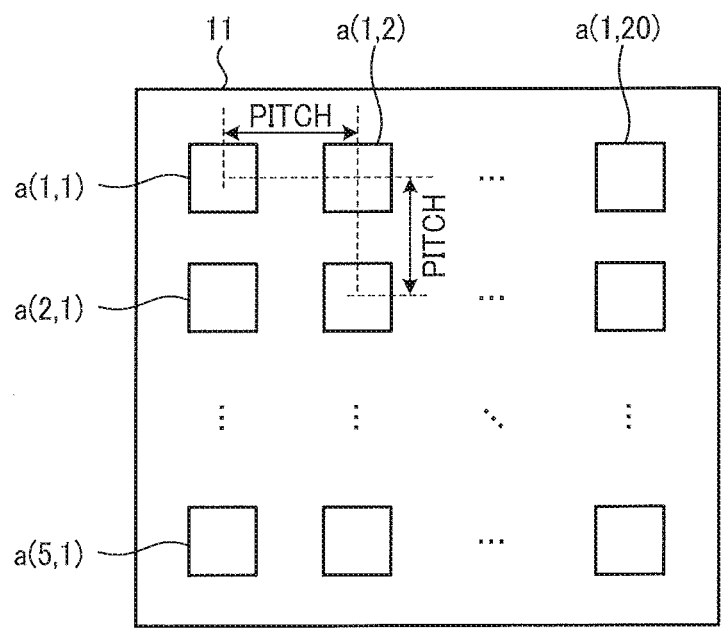
FIG. 5 is a diagram illustrating an example of a layout configuration of a VCSEL array according to an example 1.

FIG. 5 is a diagram illustrating an example of a layout configuration of a VCSEL array according to an example 1. A VCSEL array 11 illustrated in FIG. 5 has a layout configuration in which 100 surface-emitting light emitting elements a are arranged in a VCSEL array surface at an equal pitch that is a same element interval.

In FIG. 5, numbers illustrated at an X position of the light emitting element a (X, Y) represent row numbers and numbers illustrated at a Y position represent column numbers. That is, a total number of the light emitting elements a is 5 rows×20 columns=100. Since a number of terminals is limited, each light emitting element a is not individually lit, and for example, each square of 1, 4, 9, . . . , 100 and n are lighted and controlled. However, two lines of n are used in order to facilitate comparison with the theoretical value of the speckle reduction effect, and the embodiments of the present disclosure are not limited to this.

The element interval (pitch) of each light emitting element a is set to 300 μm, which fulfills following two conditions, in order to achieve the "setting having a speckle noise reduction effect". The 300 μm is illustrated as an example, and the element interval is not limited to this.

Condition 1: Element interval at which irradiation light beams of a plurality of light emitting elements overlap in an assumed projection area Condition 1 is that, for example, considering an assumed distance to a screen (LWD) and an emission angle (FFP) of the light emitting elements, lights of the light emitting elements at both ends of the VCSEL array 11 sufficiently overlap in an irradiated area (projection area) of a screen. If the lights from the light emitting elements at both ends sufficiently overlap, the lights from the light emitting elements located between the both ends should also sufficiently overlap. This is an example of using all the arranged light sources, and the speckle reduction effect can be obtained as long as the element interval is such that the irradiation light beams of at least adjacent light emitting elements among the plurality of light emitting elements overlap.

Condition 2: Element interval at which a speckle pattern of each of the irradiation light beams obtained in the assumed projection area is different for each of the irradiation light beams.

Condition 2 indicates that, for example, with the assumed distance to the screen (LWD), the angle (θ) between each laser light required for light source multiplexing can ensure a value that converges to the theoretical value. A fact that the angle (θ) ensures a value that converges to the theoretical value fulfills a condition that the speckle pattern of each irradiation light beam is different for each irradiation light beam even if the number of the lighted light emitting elements increases.

Figure 6A:
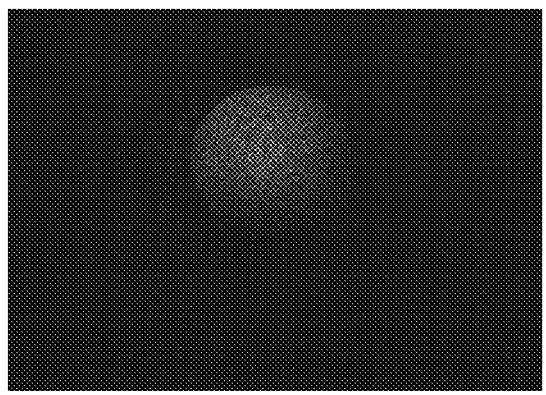
FIGS. 6A and 6B are an example of a speckle image captured in a case where 1 cH (one light emitting element) is lit and in a case where all 100 cH are lit with the use of the VCSEL array illustrated in FIG. 5.
Figure 6B:
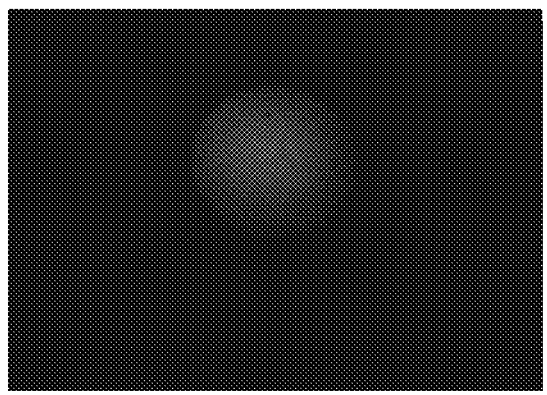

FIGS. 6A and 6B are an example of a speckle image captured in a case where 1 cH (one light emitting element) is lit and in a case where all 100 cH are lit with the use of the VCSEL array 11 illustrated in FIG. 5. FIG. 6A is a speckle image captured in a case where 1 cH is lit, and FIG. 6B is a speckle image captured in a case where all 100 cH is lit.

Comparing these captured images, the flicker of light and dark dramatically decreased in the captured image when lighting 100 cH compared to the captured image when lighting 1 cH, and it can be seen that the speckle noise reduction effect by light source multiplexing is effective.

Figure 7:
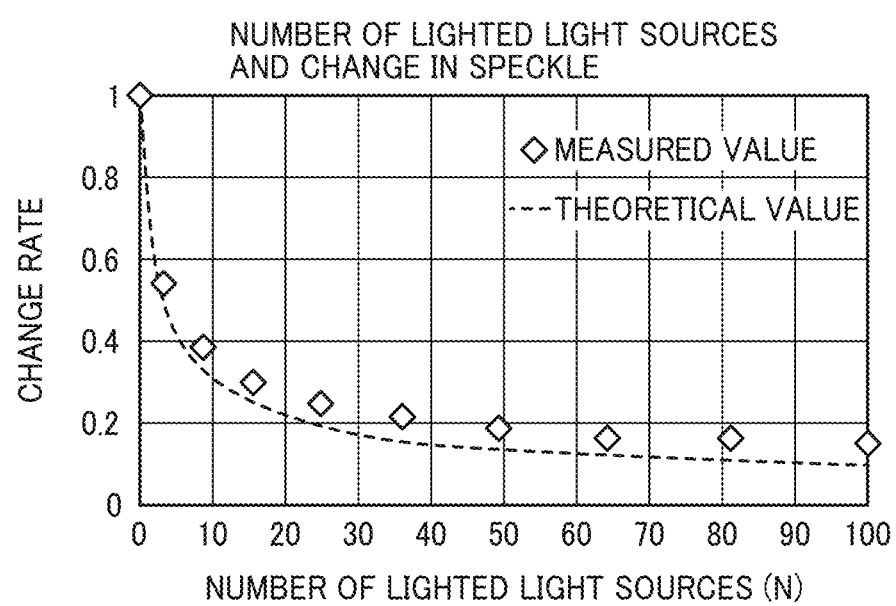
FIG. 7 is a graph illustrating experimental results of a speckle noise reduction effect when the VCSEL array according to the example 1 is used.

FIG. 7 is a graph illustrating experimental results of the speckle noise reduction effect when the VCSEL array 11 according to the example 1 is used. FIG. 7 is different from the experimental results of the 40 cH-VCSEL light source illustrated in FIG. 3. Even if the number of the lighted light sources is increased, the speckle contrast (Cs) continues to decrease and follows the dashed line curve graph (theoretical value), and the speckle noise reduction effect close to the theoretical value is obtained.

Although there is a slight difference between an actual value of a plot and the theoretical value represented by the dashed line in FIG. 7, this difference is due to, in part, a fact that the captured image contains all variation factors such as pixel variations of the camera per se. In addition, as the number of the lighted light sources is increased, similar speckle patterns may be present among the light sources, which may also be considered as a factor. In order to accurately measure a slight difference, it is required to devise measures to measure minute speckle noise because there is a measurement limit of an observation system per se.

From the above results, if an element interval of light emitting elements is appropriately set so as to fulfill the above conditions 1 and 2, even if a large number of light emitting elements are provided in one chip of a VCSEL light source, it is possible to exhibit an effectiveness that the speckle noise reduction effect of the theoretical value $1/\sqrt{n}$ could be obtained according to a number of the light emitting elements being lighted. Therefore, if light emitting elements are integrated so as to fulfill the above conditions 1 and 2 in a surface of the VCSEL light source, speckle noise can be reduced without increasing a size and a cost of an illuminator.

The layout illustrated in FIG. 5 is an example, and the number of light emitting elements, the shape of an opening, the arrangement of the light emitting elements, and the like are not limited to this. As long as the conditions 1 and 2 are fulfilled, the number of the light emitting elements, the shape of the opening, the arrangement of the light emitting elements, and the like may be modified as appropriate.

Example 2

Figure 8:
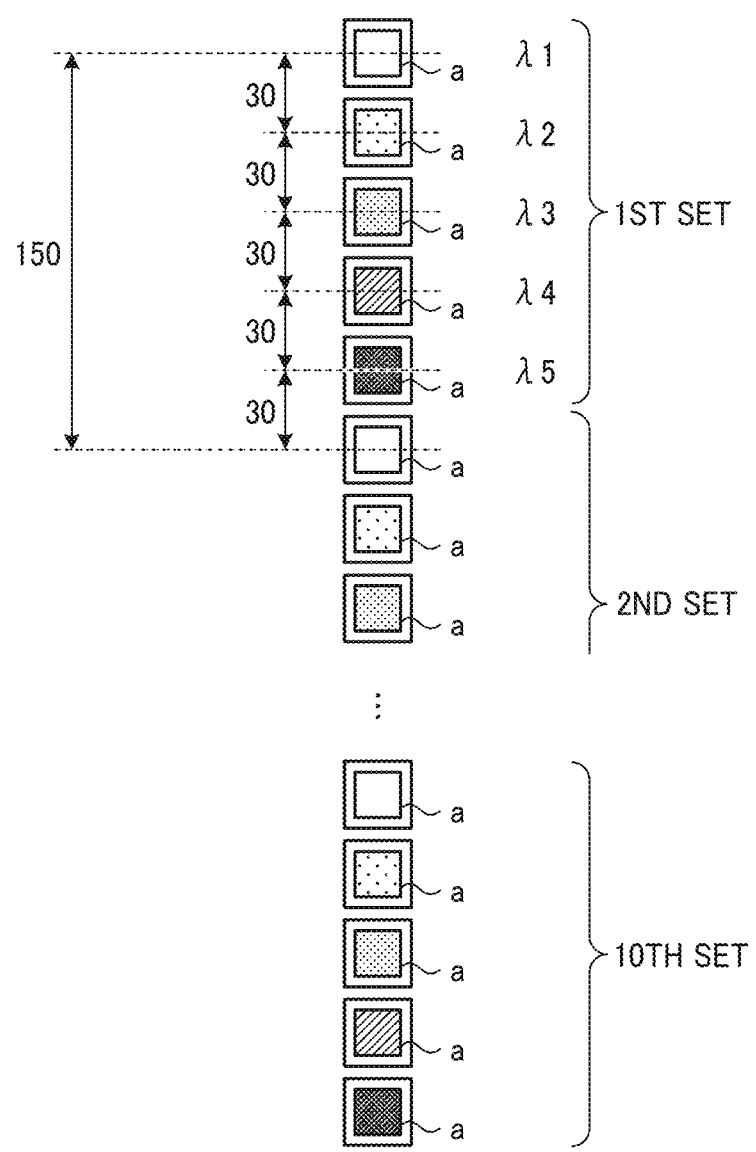
FIG. 8 is a diagram illustrating an example of a layout configuration of a VCSEL array according to an example 2.

FIG. 8 is a diagram illustrating an example of a layout configuration of a VCSEL array including light emitting elements a having a different oscillation wavelength (hereinafter abbreviated as a wavelength) according to an example 2. The figure illustrates one-dimensionally arranged light emitting elements a having a different wavelength (a wavelength $\lambda 1$, a wavelength $\lambda 2$, a wavelength $\lambda 3$, a wavelength $\lambda 4$, and a wavelength $\lambda 5$).

The speckle pattern is formed on an observed surface by interference of scattered light having a disordered phase, which is generated when laser is irradiated to a screen. A phase shift of the scattered light is mainly determined by an optical path length due to an unevenness (roughness) on a screen surface and an oscillation wavelength of the laser. In the multiple light source angle-multiplexing of the example 1, the speckle pattern is changed by changing an optical path length according to the angle θ formed by the laser light of each light source and changing the phase of the scattered light. On the other hand, in this example 2, the oscillation wavelength of the laser per se is modulated to change the phase of the scattered light, and the changed speckle pattern is superimposed to reduce noise (wavelength multiplexing). Therefore, when the wavelength multiplexing is used to obtain different speckle patterns, it is not necessarily required to fulfill the condition 2 in a case of single wavelength and there is an advantage that layout constraints are relaxed.

In FIG. 8, light emitting elements a (light emitting element group) having five different wavelengths (the wavelength $\lambda 1$, the wavelength $\lambda 2$, the wavelength $\lambda 3$, the wavelength $\lambda 4$, and the wavelength $\lambda 5$) are set as one set of a minimum unit, and a layout in which ten sets of the light emitting elements a in total (five types of wavelengths×10 sets=50) are one-dimensionally arrayed at a pitch of 30 μm is illustrated.

The arrangement order of the light emitting elements a in each set is a predetermined wavelength order. That is, the light emitting elements a having each wavelength are periodically arranged, and the pitch of the light emitting elements a having the same wavelength between each set is 150 μm (30 μm×5=150 μm). This setting is based on a premise that a system requires an inter-element pitch of 150 μm or more to obtain a speckle reduction effect by light source multiplexing.

By setting an inter-element pitch as an example in such a layout, each light emitting element a having the same wavelength included in all sets fulfills the inter-element pitch required for multiple light source angle-multiplexing, and thus the adjacent light emitting elements a in each set have a different oscillation wavelength, thereby resulting in each light emitting element a having a different speckle pattern. Therefore, also in the layout of the example 2, the speckle noise reduction effect according to the number of the light emitting elements can be expected.

A light emitting area of 7.35 mm is required (calculation formula: 150 μm×(50−1)=7.35 mm) in light source multiplexing with light emitting elements a each having a single wavelength whereas the required light emitting area becomes 1.47 mm (calculation formula: 30 μm×(50−1)= 1.47 mm) in a case where 50 light emitting elements a are linearly arranged one-dimensionally as in the present example. Thus, even if a chip size is reduced to ⅕, the same $1/\sqrt{50}$ speckle contrast reduction effect is obtained.

The layout illustrated in FIG. 8 is an example, and the number of the light emitting elements included in the light emitting element group, an order of the wavelengths, the shape of an opening, the arrangement of the light emitting element group, and the like are not limited to this. As long as conditions for wavelength multiplexing are fulfilled in addition to the conditions 1 and 2, the number of the light emitting elements included in the light emitting element group, the order of the wavelengths, the shape of an opening, the arrangement of the light emitting element group, and the like may be modified as appropriate.

Figure 9:
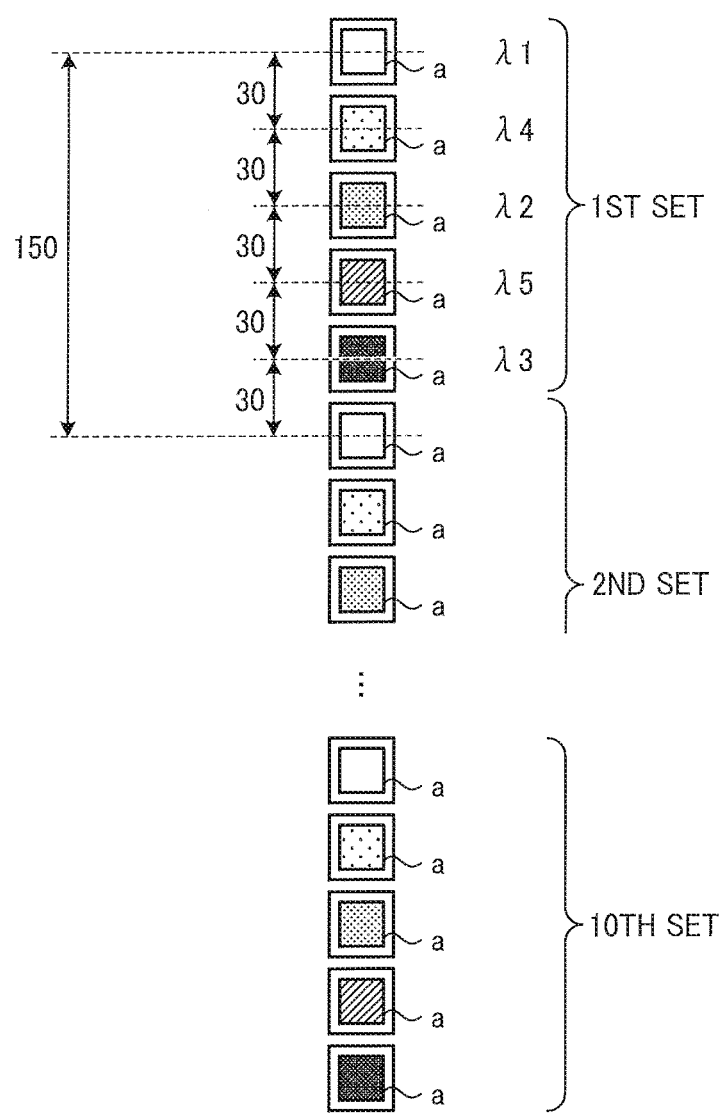
FIG. 9 is a diagram illustrating an example in which an arrangement order of light emitting elements having a different wavelength in a set is randomized.

FIG. 9 is an example in which an arrangement of light emitting elements having a different wavelength (in an order of a wavelength λ1, a wavelength λ2, a wavelength λ3, a wavelength λ4, and a wavelength λ5) in a set is randomized to be λ1, λ4, λ2, λ5, λ3 in such a manner that light emitting elements having an adjacent wavelength are not to be adjacent to each other. With this arrangement, a wavelength difference between adjacent light emitting elements is larger than the wavelength difference in the layout of FIG. 8 arranged in the order of wavelengths. Therefore, the wavelength difference between adjacent light emitting elements is secured even when a result of the wavelength of each light emitting element varies, and the speckle noise reduction effect is easily obtained.

In addition, as the wavelength difference between elements increases, the inter-element pitch required to obtain different speckle patterns also decreases, and thus further miniaturization can be expected depending on the system. Other than that, since the same speckle reduction effect is obtained even when the inter-element pitch is maintained or the entire wavelength difference Δλ (λ1−λ5) is narrowed, it would be easy to form a structure for the light emitting elements to emit light having a different wavelength.

Also in the example 2, light emitting elements having a different oscillation wavelength are integrated in a surface of the VCSEL light source, whereby an effect in which speckle noise can be reduced without increasing a size and a cost of an illuminator can be obtained. In addition, since lasers having a different wavelength are used, it is not necessarily required to fulfill the condition 2 in a case of single wavelength and there is an advantage that layout constraints are relaxed. Therefore, since each light emitting element can be provided at a narrower interval than in the multiple light source angle-multiplexing, integration density can be improved. By increasing the integration density, further effects can be expected, such as miniaturization of a chip and an increase in a degree of freedom in a design since a remaining area can be used.

Example 3

Figure 10:
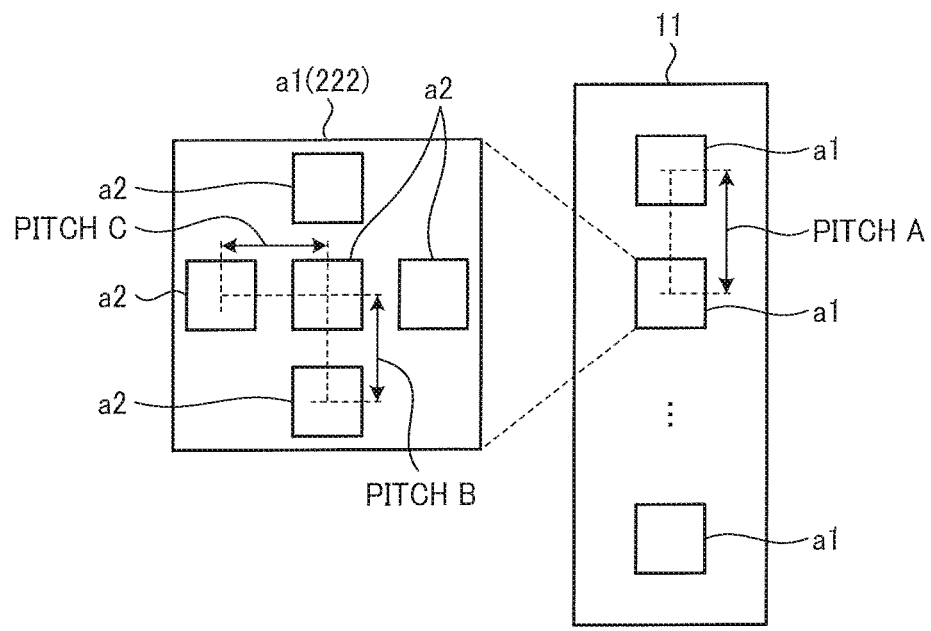
FIG. 10 is a diagram illustrating a variation of a configuration of the VCSEL array.

FIG. 10 is a diagram illustrating a variation of the configuration of the VCSEL array 11. The VCSEL array 11 illustrated in FIG. 10 includes at least one light emitting element group a1 called a layer controlled to cause a plurality of light emitting elements to emit light simultaneously. While FIG. 10 illustrates the VCSEL array 11 in which the light emitting element group a1 is one-dimensionally arrayed, the light emitting element group a1 may be two-dimensionally arranged. A light emission timing of each layer 222 is independently controlled.

In the layer 222 illustrated in FIG. 10, five light emitting elements a2 are arranged in a cruciform. In the same layer 222, each light emitting element a2 is controlled to emit light at the same timing.

A pitch A of each layer 222 and a pitch (pitch B and pitch C) of each light emitting element a2 illustrated in FIG. 10 are set on the basis of the conditions 1 and 2 of the inter-element pitch in the example 1. In addition, when the oscillation wavelength of each light emitting element is made different, the light source of the example 2 is applied.

Here, while the layer 222 in which five light emitting elements a2 are arranged in the cruciform is illustrated, the layer 222 is not limited to this. The number of the light emitting elements a2 may be increased or decreased, or more light emitting elements a2 may be arranged in a layout such as a honeycomb structure.

In addition, while an opening of the light emitting element a2 is illustrated as a square, it may be another shape such as a hexagon.

Second Embodiment

Figure 11:
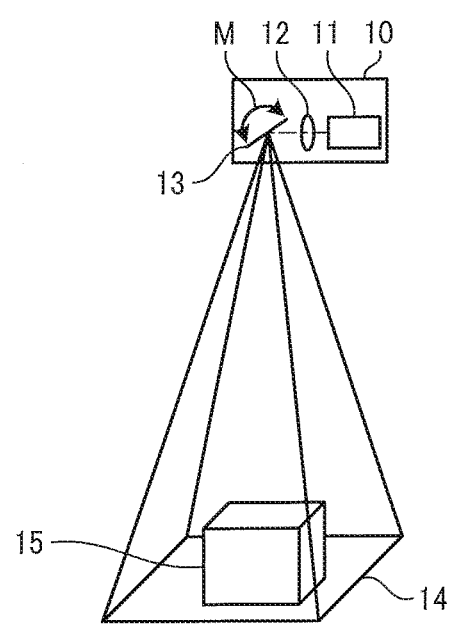
FIG. 11 is a diagram illustrating an example of a configuration of a projection device according to a second embodiment.

A projection device including the surface emitting semiconductor laser according to a second embodiment will be described. FIG. 11 is a diagram illustrating an example of a configuration of a projection device according to a second embodiment. The projection device 10 illustrated in FIG. 11 includes the VCSEL array 11, an optical system 12, and a light deflection element 13.

The optical system 12 is configured by a lens, and guides the light emitted from each light emitting element of the VCSEL array 11 to the light deflection element 13.

The light deflection element 13 projects light from the optical system 12 onto a projection area thereby projecting projection light 14 onto an object 15.

The projection light 14 illustrated in FIG. 11 is light in which the emitted lights of the respective light emitting elements a of the VCSEL array 11 overlap with each other, and is deflected on a mirror surface of the light deflection element 13 and projected onto the object 15. Also in the second embodiment, the speckle noise reduction effect can be obtained by projecting the projection light 14 on an assumed projection area.

The light deflection element 13 is a movable mirror capable of scanning laser light in one or two axes directions. While the movable mirror may be, for example, a micro electro mechanical systems (MEMS) mirror, a polygon mirror, or a galvano mirror, a mirror using another method can be used as long as the mirror can scan laser light in one or two axes. In this embodiment, a movable mirror that uniaxially scans line light 14 formed by the optical system 12 on a measurement object 15 in a scanning range is used. The movable mirror forms a two-dimensional projection pattern by scanning the line light.

Figure 12:
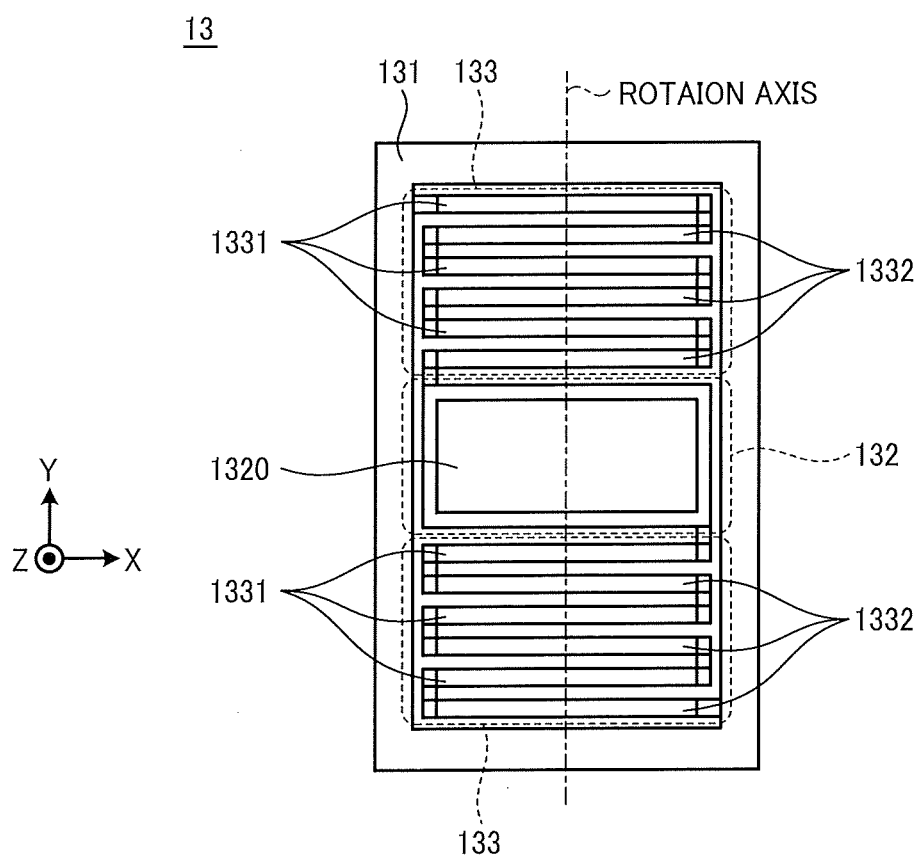
FIG. 12 is a diagram illustrating an example of a configuration of a light deflection element.

FIG. 12 is a diagram illustrating an example of a configuration of a MEMS mirror (also referred to as a MEMS mirror scanner) which is an example of the light deflection element 13. The MEMS mirror scanner illustrated in FIG. 12 has a movable section 132 and two sets of serpentine beam sections 133 on a support substrate 131.

The movable section 132 includes a reflection mirror 1320. One end of each of the two sets of the serpentine beam sections 133 is connected to the movable section 132, and another end is supported by the support substrate 131. The two sets of the serpentine beam sections 133 are respectively composed of a plurality of meander-shaped beam parts, and both of the two sets of the serpentine beam sections 133 include a first piezoelectric member 1331 deformed by application of a first voltage, and a second piezoelectric member 1332 deformed by application of a second voltage alternately in each beam part. The first piezoelectric member 1331 and the second piezoelectric member 1332 are provided independently for each adjacent beam part. The two sets of the serpentine beam sections 133 are deformed by the application of a voltage to the first piezoelectric member 1331 and the second piezoelectric member 1332 respectively, and rotates the reflection mirror 1320 of the movable section 132 about a rotation axis.

Specifically, a voltage having an opposite phase is applied to the first piezoelectric member 1331 and the second piezoelectric member 1332 to generate warpage in each beam part. As a result, the adjacent beam parts bend in different directions and the bend is accumulated, and the reflection mirror 1320 reciprocates about the rotation axis together with the movable section 132 coupled to the two sets of the serpentine beam sections 133. Furthermore, a sine wave having a drive frequency matched to a mirror resonance mode whose rotation center is the rotation axis is applied to the first piezoelectric member 1331 and the second piezoelectric member 1332 in a reverse phase, and a large rotation angle thereby can be achieved with a very low voltage.

The drive waveform is not limited to a sine wave. For example, the drive waveform may be a sawtooth wave. In addition, a non-resonance mode may be used for the drive, not limited to the resonance mode.

The light deflection element 13 is not limited to the MEMS mirror, and may be a movable object such as a polygon mirror, a galvano mirror, or the like that includes a reflector that scans light. The MEMS mirror is advantageous in terms of size reduction and weight reduction. A driving system of the MEMS mirror may be any of an electrostatic type, a piezoelectric type, an electromagnetic type, or the like.

Third Embodiment

An example in which the surface emitting semiconductor laser according to the first embodiment is applied to a measurement device will be illustrated. Here, an example of application to a three-dimensional measurement device that measures a measured object is illustrated as an example of the measurement device.

Figure 13:
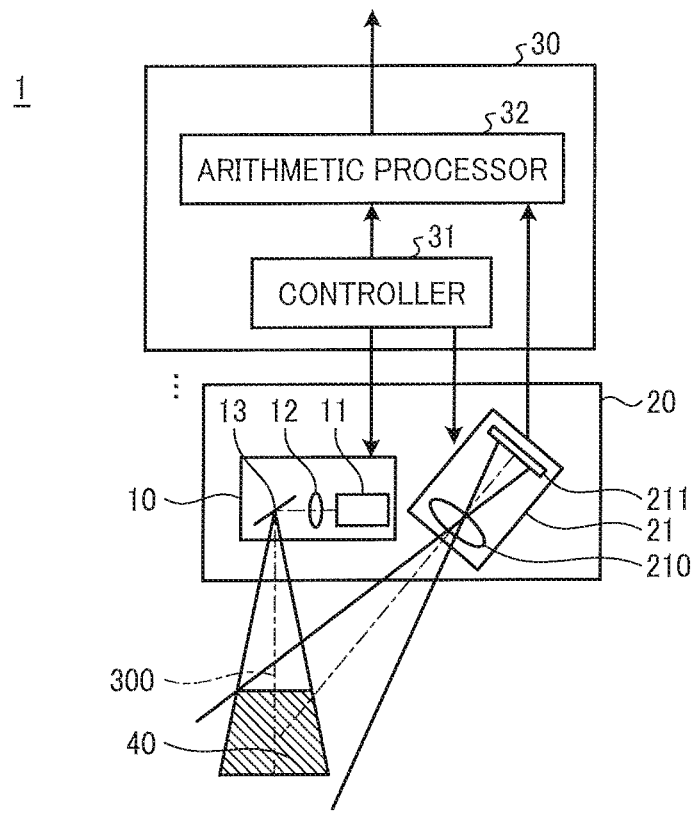
FIG. 13 is a diagram illustrating an example of a block configuration of the measurement device.

FIG. 13 is a diagram illustrating an example of a measurement device according to a third embodiment. A measurement device 1 illustrated in FIG. 13 includes a measurement information acquisition unit 20 and a control unit 30.

The measurement information acquisition unit 20 includes the projection device 10 which is a projector, and a camera 21 which is an imager. The projection device 10 includes the VCSEL array 11, the optical system 12, and the light deflection element 13. The measurement information acquisition unit 20 deflects the light of the plurality of light emitting elements a of the VCSEL array 11 by the light deflection element 13 and projects the light to a measurement area in accordance with the control of a controller 31 of the control unit 30. The controller 31 adjusts a luminance and a lighting timing of each light emitting element a of the VCSEL array 11, thereby projecting the projection light 14 having a predetermined pattern on the entire measurement area. For example, the controller 31 controls turning on and off (on/off) of the light emitting element a, thereby projecting the projection light 14 having a desired projection pattern such as a black and white gray code pattern.

The position and angle of the camera 21 are fixed in such a manner that a projection center 300 of the projection light 14 projected onto the measured object by the projection device 10 is at a center of an imaging region 40. With this, the camera 21 captures an image of a projection area.

The camera 21 includes a lens 210 and an image sensor 211. As the image sensor 211, for example, an image sensor of a charge coupled device (CCD) or a complementary metal oxide semiconductor (CMOS) is used. The light incident on the camera 21 forms an image on the image sensor 211 through the lens 210 and is photoelectrically converted. An electric signal photoelectrically converted by the image sensor 211 is converted into an image signal, and the image signal is output from the camera 21 to an arithmetic processor 32 of the control unit 30.

The control unit 30 performs projection control of pattern light by the projection device 10, imaging control by the camera 21, and the like, and performs an arithmetic process such as three-dimensional measurement of a measured object on the basis of the signal of the image captured by the camera 21. The controller 31 may perform control which switches the pattern light projected by the projection device 10 to another pattern light. In addition, the controller 31 may perform control to output calibration information that the arithmetic processor 32 uses for calculating a three-dimensional coordinate.

The control unit 30 includes the arithmetic processor 32 as a measurer. The arithmetic processor 32 calculates (measures) a three-dimensional coordinate on the basis of the input image signal, and acquires a three-dimensional shape. In addition, the arithmetic processor 32 outputs three-dimensional shape information indicating the calculated three-dimensional shape to a PC or the like (not illustrated) in accordance with an instruction from the controller 31. While FIG. 13 illustrates a configuration in which one set of measurement information acquisition units 20 is attached to the control unit 30, a plurality of sets of measurement information acquisition units 20 may be attached to the control unit 30.

(Description of a Functional Block of a Controller)

Figure 14:
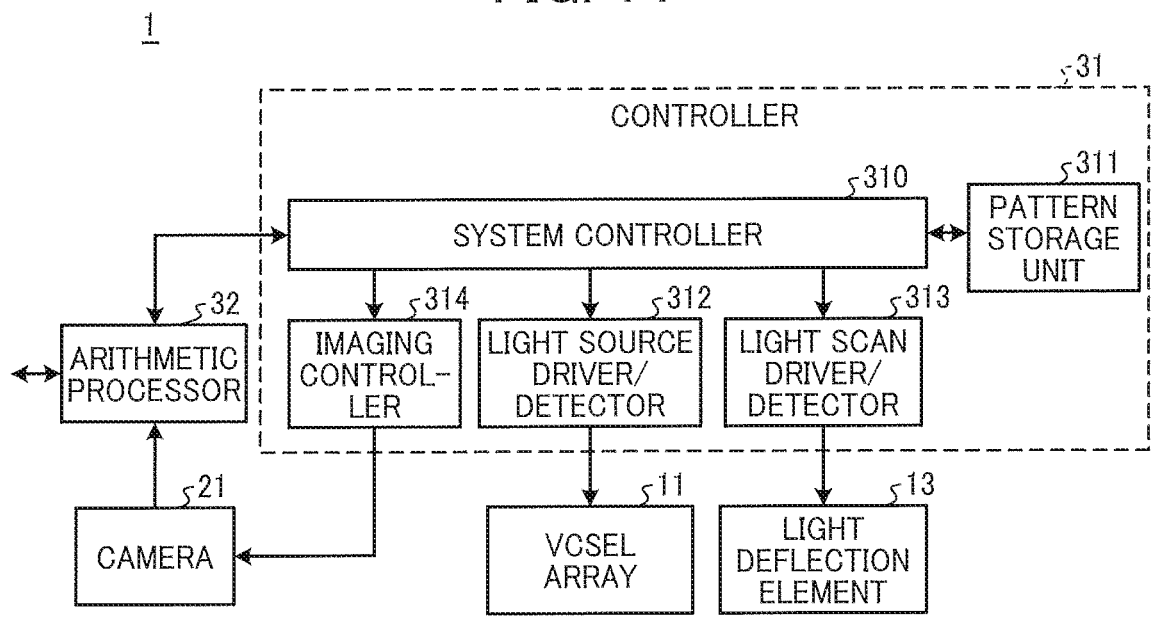
FIG. 14 is a diagram illustrating an example of a block configuration of the measurement device.

FIG. 14 is a diagram illustrating an example of a block configuration of the measurement device 1. In FIG. 14, parts that have already been described are denoted by the same reference numerals, and a detailed description thereof will be appropriately omitted.

The arithmetic processor 32 illustrated in FIG. 14 analyzes the image signal output from the camera 21. The arithmetic processor 32 performs a three-dimensional information restoration process by an arithmetic process using an analysis result of the image signal and calibration information, and thereby executes a three-dimensional measurement of an object. The arithmetic processor 32 supplies the restored three-dimensional information to the controller 31.

The controller 31 includes a system controller 310, a pattern storage unit 311, a light source driver/detector 312, a light scan driver/detector 313, and an imaging controller 314.

The light scan driver/detector 313 drives the light deflection element 13 in accordance with the control by the system controller 310. The system controller 310 controls the light scan driver/detector 313 in such a manner that the light irradiated to a deflection center of the light deflection element 13 irradiates the measured object. The imaging controller 314 controls an imaging timing and a light exposure amount of the camera 21 in accordance with the control by the system controller 310.

The light source driver/detector 312 controls turning on and off of each light emitting element of the VCSEL array 11 in accordance with the control by the system controller 310.

The pattern storage unit 311 reads out, for example, pattern information of a projection image stored in a non-volatile storage medium of the measurement device 1. The pattern information is for forming a projection image (projection pattern). The pattern storage unit 311 reads out the pattern information in accordance with an instruction from the system controller 310 and passes the pattern information to the system controller 310. The system controller 310 controls the light source driver/detector 312 on the basis of the pattern information passed from the pattern storage unit 311.

The system controller 310 instructs the pattern storage unit 311 to read out the pattern information on the basis of the restored three-dimensional information supplied from the arithmetic processor 32. The system controller 310 controls the light source driver/detector 312 in accordance with the pattern information read out by the pattern storage unit 311.

In addition, the system controller 310 instructs the arithmetic processor 32 on an arithmetic method, according to the read-out pattern information.

The arithmetic processor 32, the system controller 310, and the imaging controller 314 are implemented by a measurement program that operates on a central processing unit (CPU). Specifically, the CPU reads and executes the measurement program from a read only memory (ROM), thereby implementing the arithmetic processor 32, the system controller 310, and the imaging controller 314. This implementation method is an example, and the embodiments of the present disclosure are not limited to this. For example, a part or all of the arithmetic processor 32, the system controller 310, and the imaging controller 314 may be configured by hardware circuits operating in cooperation with each other. In addition, not limited to the arithmetic processor 32, the system controller 310, and the imaging controller 314, other blocks may be also implemented by the measurement program.

In the third embodiment, each setting of the measurement device is set as "setting having a speckle noise reduction effect". For this reason, speckle noise is reduced in an image obtained by capturing a measured object, and measurement accuracy when analyzing luminance information of the captured image is improved.

Fourth Embodiment

Next, a fourth embodiment will be described. The fourth embodiment is an example in which the measurement device 1 according to the third embodiment is used in combination with a robot arm (an articulated arm).

Figure 15:
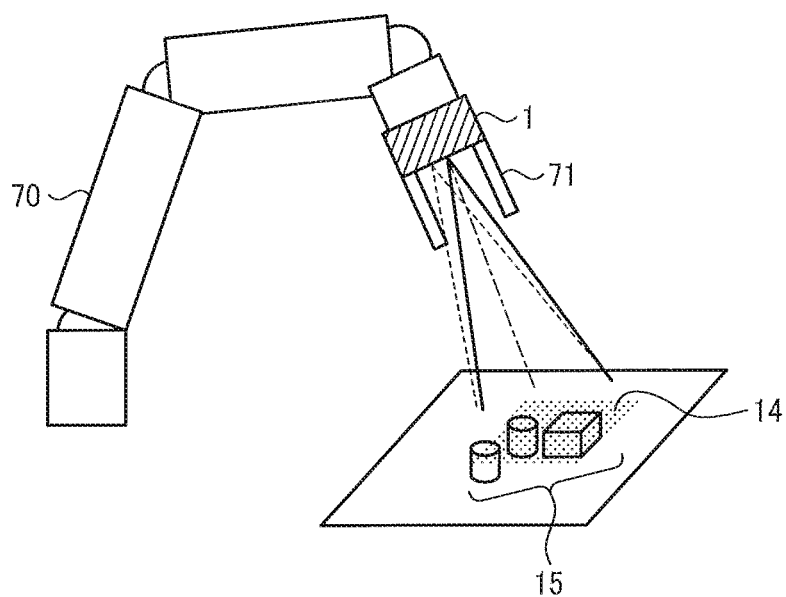
FIG. 15 is a diagram illustrating an example of a configuration of a robot according to a fourth embodiment.

FIG. 15 is a diagram illustrating an example of a configuration of a robot according to the fourth embodiment. FIG. 15 illustrates an example in which the measurement device 1 is applied to a robot arm having multiple joints. A robot arm 70 includes a hand section 71 for picking an object, and the measurement device 1 is mounted in the immediate vicinity of the hand section 71. The robot arm 70 includes a plurality of bendable movable sections, and changes the position and orientation of the hand section 71 in accordance with control.

The measurement device 1 is provided in such a manner that a projection direction of light coincides with a direction in which the hand section 71 is directed, and measures a picking object 15 of the hand section 71 as a measured object.

As described above, in the fourth embodiment, the measurement device 1 is mounted on the robot arm 70, and it is thereby possible to measure an object for picking from a short distance and to improve the measurement accuracy compared to a measurement from a distance using a camera or the like. For example, in the field of factory automation (FA) in various assembly lines of a factory, a robot such as the robot arm 70 is used to inspect or recognize parts. Mounting the measurement device 1 on a robot enables inspection, recognition, and the like, of parts with high accuracy.

Fifth Embodiment

Next, a fifth embodiment will be described. The fifth embodiment is an example in which the measurement device 1 according to the third embodiment is mounted on an electronic device such as a smartphone and a PC.

Figure 16:
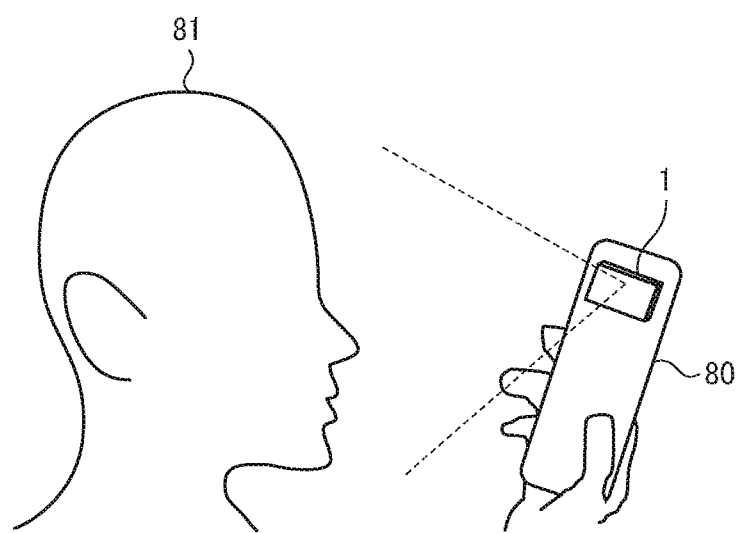
FIG. 16 is a diagram illustrating an example of a configuration of an electronic device such as a smartphone according to a fifth embodiment.

FIG. 16 is a diagram illustrating an example of a configuration of an electronic device such as a smartphone according to the fifth embodiment. The example in which the measurement device 1 is applied to a smart phone 80 is illustrated. The smartphone 80 is equipped with the measurement device 1 and a user authentication function. The user authentication function is provided, for example, by dedicated hardware. The "authentication function unit" is not limited to dedicated hardware, and for example, a program in a ROM or the like may be executed by a CPU constituting a computer so as to realize this function. The measurement device 1 measures a shape or the like of the face, ears and head of a user 81. On the basis of this measurement result, the user authentication function determines whether the user 81 is a person registered in the smartphone 80.

As described above, in the fifth embodiment, the measurement device 1 is mounted on the smartphone 80, and it is thereby possible to measure the shape or the like of the face, ears and head of the user 81 with high accuracy and to achieve an improvement in the recognition accuracy. While the measurement device 1 is mounted on the smartphone 80 in this embodiment, the measurement device 1 may be mounted on an electronic device such as a PC or a printer. In addition, a functional aspect is not limited to a personal identification function, and the measurement device 1 may be used for a scanner for a face shape.

Sixth Embodiment

Next, a sixth embodiment will be described. The sixth embodiment is an example in which the measurement device 1 according to the third embodiment is mounted on a mobile object.

Figure 17:
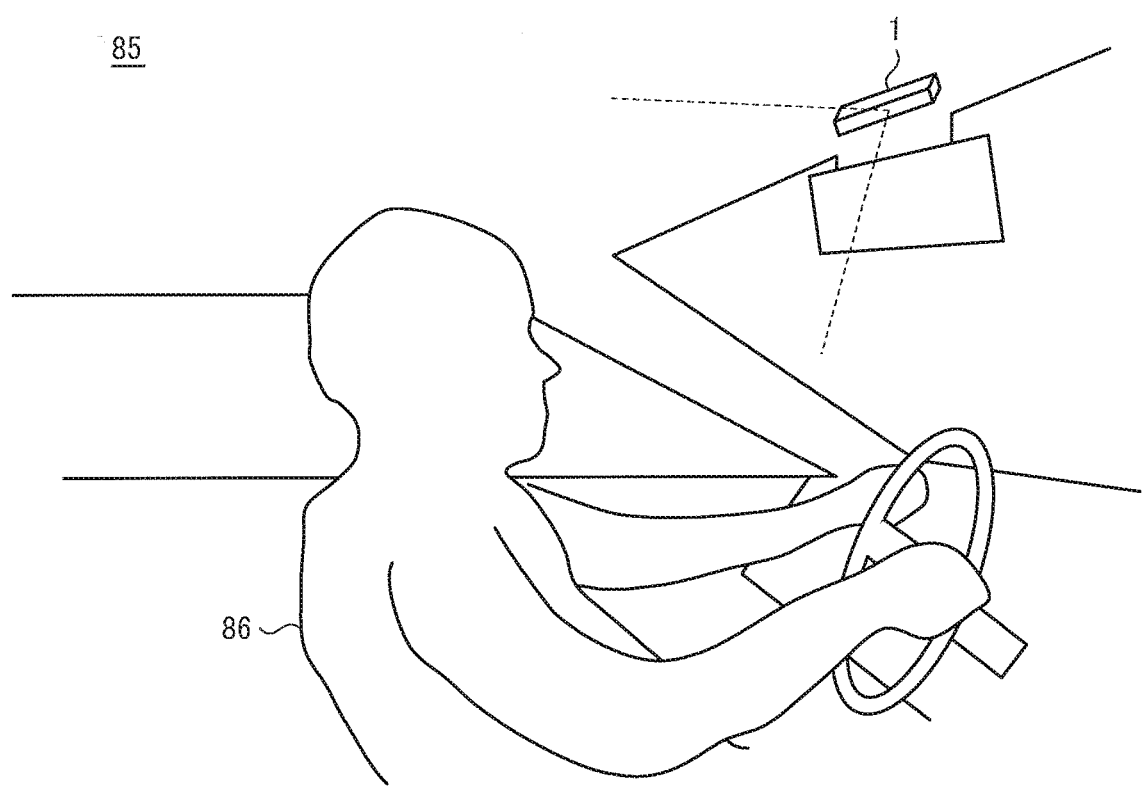
FIG. 17 is a diagram illustrating an example of a configuration of a vehicle according to a sixth embodiment.

FIG. 17 is a diagram illustrating an example of a configuration of a vehicle according to the sixth embodiment. The example in which the measurement device 1 is applied to an automobile is illustrated. The measurement device 1 and a drive support function are mounted in an inside of an automobile 85. The drive support function is provided, for example, by dedicated hardware. The "drive supporter" is not limited to dedicated hardware, and in addition to this, for example, a program in a ROM or the like may be executed by a CPU constituting a computer so as to implement this function. The measurement device 1 measures the face, posture, and the like of a driver 86. On the basis of this measurement result, the drive support function provides appropriate support according to a situation of the driver 86.

As described above, in the sixth embodiment, the measurement device 1 is mounted on the automobile, and it is thereby possible to measure the face, posture, and the like of the driver 86 with high accuracy and to achieve an improvement in the state recognition accuracy of the driver 86 in the automobile 85. While the measurement device 1 is mounted on an automobile in this embodiment, the measurement device 1 may be mounted on an inside of a train car, in a pilot seat (or passenger seat) of an airplane, etc. In addition, the functional aspect is not limited to recognizing the state of the driver 86 such as the face and posture of the driver 86, and the measurement device 1 may be used to recognize a condition of a passenger other than the driver 86 and the inside of the automobile 85. Alternatively, the measurement device 1 may be used for vehicle security such as performing personal identification of the driver 86 and determining whether the driver 86 is the driver of an automobile registered in advance.

Figure 18:
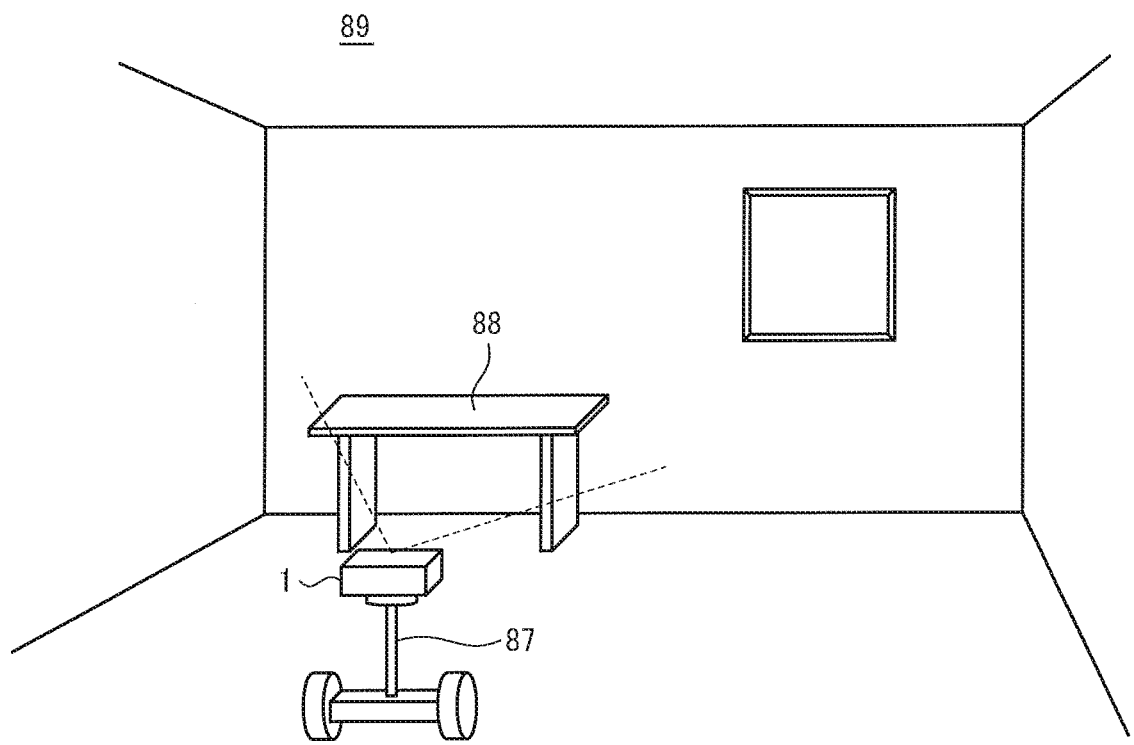
FIG. 18 is a diagram illustrating an example of a configuration of another mobile object according to the sixth embodiment.

FIG. 18 is a diagram illustrating an example of a configuration of another mobile object according to the sixth embodiment. FIG. 18 illustrates an example in which the measurement device 1 is applied to an autonomous mobile object. The measurement device 1 is mounted on a mobile object 87, and measures the periphery of the mobile object 87. On the basis of this measurement result, the mobile object 87 determines a path of movement of the mobile object 87 and calculates a layout of an interior 89, such as a position of a desk 88.

As described above, in the sixth embodiment, the measurement device 1 is mounted on the mobile object 87, and it is thereby possible to measure the periphery of the mobile object 87 with high accuracy and to support driving of the mobile object 87. While the measurement device 1 is mounted on the small-sized mobile object 87 in this embodiment, the measurement device 1 may be mounted on an automobile or the like. In addition, the measurement device 1 may be used not only indoors but also outdoors, and may be used for measuring a building or the like.

Seventh Embodiment

Next, a seventh embodiment will be described. The seventh embodiment is an example in which the measurement device 1 according to the third embodiment is mounted on a shaping apparatus.

Figure 19:
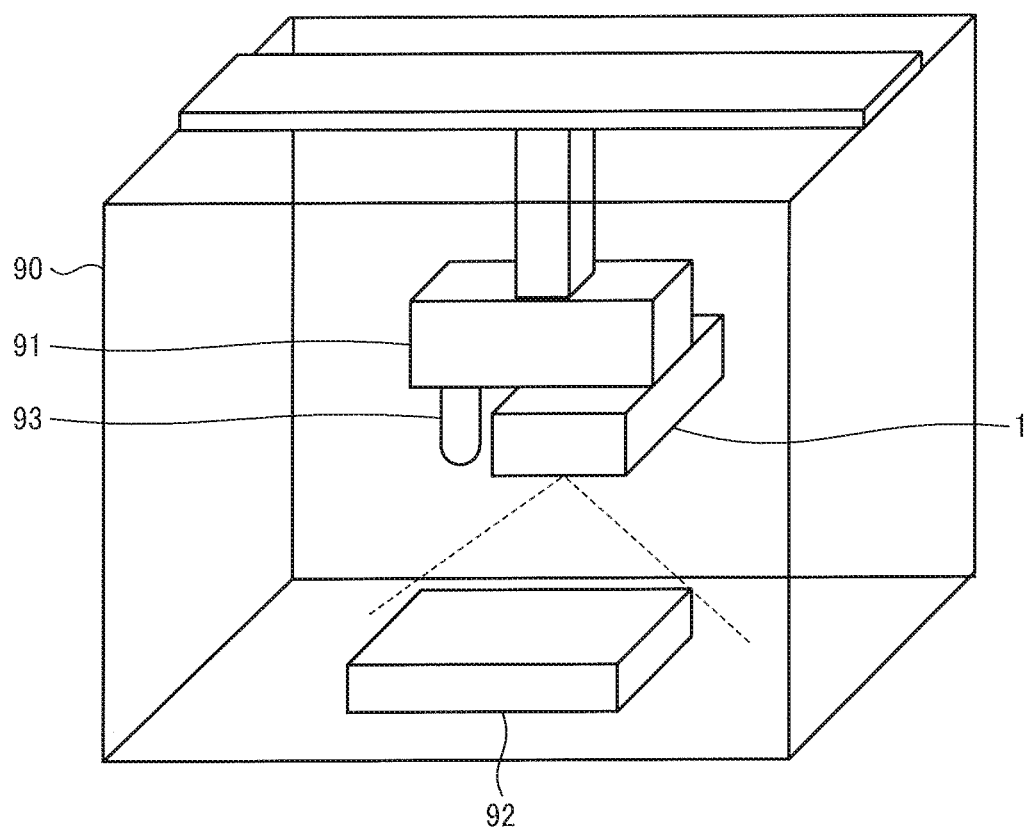
FIG. 19 is a diagram illustrating an example of a configuration of a 3D printer according to a seventh embodiment.

FIG. 19 is a diagram illustrating an example of a configuration of a shaping apparatus according to the seventh embodiment. FIG. 19 illustrates an example in which the measurement device 1 is applied to a head section 91 of a 3D printer 90 which is an example of a shaping apparatus. The head section 91 is an example of a "head" and includes a nozzle 93 that discharges a shaping liquid for forming a formed object 92. The measurement device 1 measures a shape of the formed object 92 formed by the 3D printer 90 during formation. On the basis of this measurement result, formation control of the 3D printer 90 is performed.

As described above, in the seventh embodiment, the measurement device 1 is mounted on the 3D printer 90, and it is thereby possible to measure the shape of the formed object 92 during formation and to form the formed object 92 with high accuracy. While the measurement device 1 is mounted on the head section 91 of the 3D printer 90 in this embodiment, the measurement device 1 may be mounted on another position inside the 3D printer 90.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light source, comprising:
a plurality of light emitting elements on a surface,
wherein the plurality of light emitting elements are arranged with a spatial separation such that, in an assumed projection area, irradiation light beams of the plurality of light emitting elements overlap each other, and a speckle pattern of each of the irradiation light beams obtained in the assumed projection area is different for each of the irradiation light beams.

2. The light source according to claim 1, wherein the plurality of light emitting elements are arranged with the spatial separation such that a speckle contrast obtained in the assumed projection area as a number of the plurality of light emitting elements being lighted increases, follows a theoretical value curve of a speckle contrast obtained when different speckle patterns overlap.

3. The light source according to claim 1, wherein the light source includes elements of the plurality of light emitting elements having mutually different oscillation wavelengths.

4. The light source according to claim 3, wherein the light source includes a group of the plurality of light emitting elements having a same oscillation wavelength.

5. The light source according to claim 4, wherein a first spatial separation of those elements of the plurality of light emitting elements having the different oscillation wavelength is narrower than a second spatial separation of those light emitting elements in the group, which have the same oscillation wavelength.

6. The light source according to claim 5, wherein the light emitting elements having a same particular oscillation wavelength are disposed with a same spatial separation.

7. The light source according to claim 4, wherein with one light emitting element group including the elements of the plurality of light emitting elements having the mutually different oscillation wavelengths, a plurality of the light emitting element groups is disposed in such a manner that light emitting elements of the plurality of light emitting elements having a same oscillation wavelength are positioned periodically.

8. A projection device, comprising:
the light source according to claim 1;
an optical system guiding light of each of the plurality of light emitting elements of the light source; and
a light deflection element reflecting the light guided by the optical system to the projection area.

9. A measurement device, comprising:
the projection device according to claim 8;
an imager configured to image the projection area; and
a measurer configured to measure a measured object in the projection area based on information imaged by the imager.

10. A robot, comprising:
the measurement device according to claim 9; and
an articulated arm equipped with the measurement device.

11. An electronic device comprising:
the measurement device according to claim 9; and
an authenticator configured to authenticate a user based on a measurement result of the user by the measurement device.

12. A mobile object, comprising:
the measurement device according to claim 9; and
a drive supporter configured to support driving of the mobile object based on a measurement result by the measurement device.

13. A shaping apparatus, comprising:
the measurement device according to claim 9; and
a head forming a formed object based on a measurement result by the measurement device.

14. A light source, comprising:
a plurality of surface light emitting elements,
wherein the plurality of surface light emitting elements are arranged with a spatial separation such that irradiation light beams of at least adjacent surface light emitting elements of the plurality of surface light emitting elements overlap, and a speckle pattern in an irradiated area of the irradiation light beams differs for each of the irradiation light beams.

15. The light source of claim 14, wherein the plurality of light emitting elements are arranged in a two-dimensional array, with a first spatial separation between elements in a first direction being equal to a second spatial separation between elements in a second direction orthogonal to the first direction, and the irradiation light beams of adjacent elements overlap each other.

* * * * *